Dec. 22, 1970      R. M. SHIPLEY, JR      3,548,578
TREE SHAKING APPARATUS
Filed Sept. 12, 1968                     2 Sheets-Sheet 1

INVENTOR.
ROBERT M. SHIPLEY, JR.
BY
Schapp & Hatch
ATTORNEYS

Dec. 22, 1970   R. M. SHIPLEY, JR   3,548,578
TREE SHAKING APPARATUS

Filed Sept. 12, 1968   2 Sheets-Sheet 2

INVENTOR.
ROBERT M. SHIPLEY, JR.
BY
Schapp & Hatch
ATTORNEYS 3,548,578
TREE SHAKING APPARATUS
Robert M. Shipley, Jr., Preston Heights, Cloverdale, Calif., assignor to Kelsey-Hayes Company, Romulus, Mich., a corporation of Delaware
Filed Sept. 12, 1968, Ser. No. 759,313
Int. Cl. A01g 19/00
U.S. Cl. 56—328                                4 Claims

ABSTRACT OF THE DISCLOSURE

A tree shaker apparatus, having a vibrating unit adapted for attachment to a tree trunk in such manner that the vibrating unit and the tree trunk are formed generally into a single entity, said vibating unit containing a plurality of rotors, with each rotor being driven by its own motor and having a rotating off-center weight for imparting vibration to the tree and cause a shaking action, the rotors having different moments of inertia so that the motors will drive the rotors at different rates of respective angular acceleration and deceleration, thereby providing superimposed interrelated harmonic vibration having periods of concentrated shaking action, said vibrating unit preferably being driven hydraulically with the motors operating on a parallel circuit from a common hydraulic power source.

BACKGROUND OF THE INVENTION

The present invention relates to improvement in a tree shaking apparatus, and more particularly to an apparatus known in the art as a "trunk shaker" adapted for clamping to the trunk or large limb of the tree to be shaken.

Such "trunk shakers" are widely used in harvesting ripened fruits or nuts, as well as for thinning blossoms or unripe fruit. In general, this category of tree shaker acting on the trunk or large limb of a relatively large tree derives its shaking force from a pair of eccentrically weighted rotors, one of which is rotated clockwise and the other of which is rotated counterclockwise so as to impart a vibratory motion to the unit and therefore to the tree. Two eccentric rotors, rotating in this manner, produce an augmentation of force in one direction and a cancellation of force in a direction normal to the shaking direction. A number of configurations of the pair of eccentric weights have been used.

A typical tree shaker consists of a support member on which a vibrating mechanism is mounted together with a clamping means which is utilized to fasten the unit to the trunk, or the like, of the tree to be shaken. The support member may be a typical housing, or frame, or any other structure suitable for mounting the vibrating mechanism and its drive means.

A typical example of such a shaker is shown and described in United States Patent 3,163,458 in which a pair of rotors are rotated from a single motive power means, with the rotors being located one above the other on one side of the tree. Other tree shakers have been designed which are similar in opration and which utilize a belt or gear drive so as to keep the rotors in opposed symmetry as they counter-rotate. While these tree shakers are generally suitable for the desired purpose, they have the disadvantage of providing a more or less symmetrical and unchanging force pattern because of the tie-up or fixed drive between the rotors. An improved trunk shaker having separate motors driving separate rotors was developed and is shown and claimed in applicant's United States Patent No. 3,338,040.

The shaker of the type covered by United States Patent No. 3,163,458 employs a pair of eccentric rotors of similar size and shape driven by a common belt in such a way that the relative speed of the rotors is governed by the system. A precessing effect is achieved by causing one rotor to turn somewhat faster than the other, with a resultant constant shifting of the angular vector of shaking force. While this principle results in a shaking force operating in a multitude of directions, there is no essential augmentation of the force beyond the normal augmentation and cancellation of inertial force. In applicant's Patent No. 3,338,040, the eccentric rotors are driven by utilizing two separate motors operating from the same power source but in parallel power arrangement so that the rotors are free to rotate at different speeds as they "hunt" the most symmetric pattern. During this hunting process, the shaking force pattern varies in direction more than the pattern produced by the fixed drive, and this provides an improvement in variable shaking. However, the variable effect of the system shown and described in Patent No. 3,338,040 is limited in that once a symmetric arrangement is achieved, the shaking efficiency drops and it is necessary to shut the rotors off momentarily and start again for efficient variable shaking.

SUMMARY OF THE INVENTION

It has now been found, quite unexepectedly, that by utiliznig two eccentric weights driven from two different motors operating from the same power source in which the two eccentric rotors have substantially different moments of inertia, the vibrations effectuate a harmonic action which produces intermittent periods of concentrated shaking especially capable of dislodging fruits and nuts from the trees. The substantially different moments of inertia are preferably obtained by utilizing substantially different weights for the eccentrics, although it will be appreciated that substantially different length radial arms would be operative. In addition, it will be noted that such arrangements also provide variations of eccentricity between the two rotors. In other words, one of the two rotors wobbles more than the other.

It has been observed that, in practice, the weights do not rotate at constant speeds, but the harmonic forces involved in the system of shaker and tree appear to cause the more lightly weighted side to accelerate to a point where it begins to encounter resistance, at which point it decelerates abruptly, and since the hydraulic flow to the two motors remains constant, the more heavily weighted side accelerates at the same instant. As the two weights reach the same speed a sudden sharp jar is imparted to the system, causing a far greater reaction than is achieved at any stage in the cycle of a steadily rotating system. This sudden accumulation of forces causes a jar which can actually be felt in the ground over one hundred feet away from the tree being shaken; it also causes a noticeable increase in the removal of stubborn fruit at the moment of its occurrence.

As soon as the accumulated forces are released, the heavy rotor decelerates, the light rotor accelerates, and the cycle is endlessly repeated.

That there is a distinct accumulation and release of forces is verified by the sound of the engine which drives the hydraulic pump in a typical shaker system. Just as the concentrated shaking phase is reached, the drive engine can be heard to slow down or labor, and immediately after the beat is passed, the engine accelerates. The result is that a repeated beating effect can actually be heard even from an engine operating off a governor which would otherwise cause the engine to run at a steady rate.

This concentrated shaking or beat provides exceptionally high vibratory energy and thereby achieves an especially effective shaking action. It will be appreciated that the improvement of this invention may be applied to existing equipment without requiring excessive modification thereof.

The strength of the harmonic beat increases as the rotors are increasingly mismatched up to a point where the mismatch begins to approach the order of two to one. At this point the rotors tend to run at a two to one ratio with the resulting shaking effect being different from the one to one effect only in that the lighter rotor imparts a slight additional jerk to the tree during each revolution of the heavier rotor. It is therefore desirable to adjust the weights and/or moment arms in such a way that the respective vibrations do not fall on the one to one, the two to one, and other simple multiple phases.

Accordingly, it is a primary object of the present invention to provide an improved tree shaker apparatus which is capable of providing increased shaking efficiency over that previously obtained from similar size equipment.

Another object of this invention is to provide a tree shaker apparatus of the character described, in which the vibrational shaking action is harmonic in character, i.e. it undergoes cycles of variation in vibrational energy with certain short time increments providing especially high energy concentrations.

A further object of the present invention is to provide a tree shaker of the character described which may be obtaind by simple modification of existing tree shaker apparatus to incorporate the invention herein and impart substantial improvement thereto.

Still another object of the invention is to provide a tree shaker apparatus of the character described in which concentrated shaking action is provided in a randomly variable direction whereby complete shaking of the tree may be achieved rapidly and efficiently.

Further objects and advantages of the invention will be apparent as the specification progresses.

BRIEF DESCRIPTION OF THE DRAWING

The preferred forms of my invention are illustrated in the accompanying drawing, forming part of this description, in which.

Figure 1:
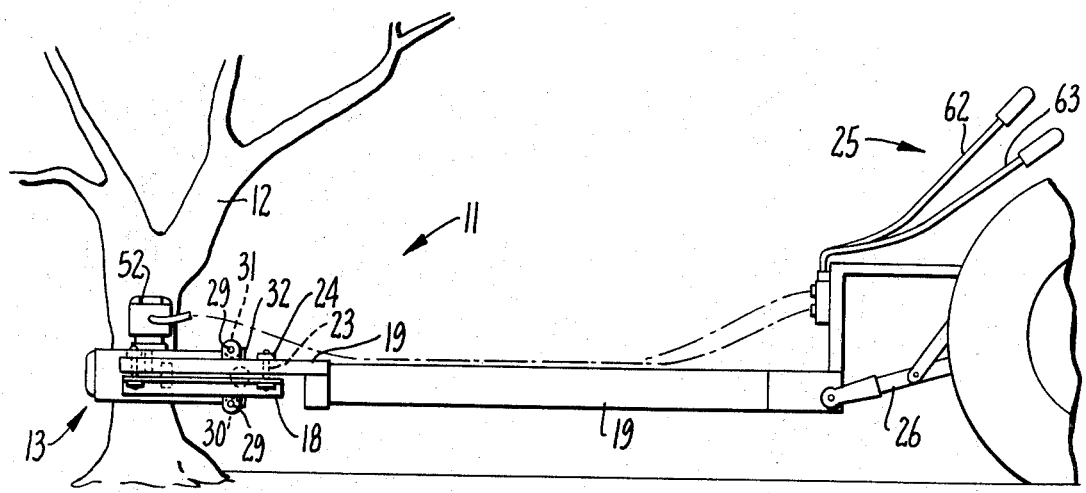
FIG. 1 is a side elevational view illustrating a typical tree shaking aparatus constructed according to the invention as it appears in operative position on a tree with the shaker being mounted on the end of a tractor.

While only the preferred forms of the invention are shown, it should be understood that various changes or modifications may be made.

DESCRIPTION OF THE PREFERRED EMBODIMENTS

Referring to the drawing in greater detail, there is shown a tree shaking apparatus 11 adapted to be clamped to a tree 12 to be shaken and comprising a vibrating unit 13, containing a pair of eccentrically weighted rotors 14 and 16, together with means for imparting rotary motion to each of the rotors and a clamping means 17 for holding the vibrating unit 13 in place on the tree 12.

Figures 2, 4:
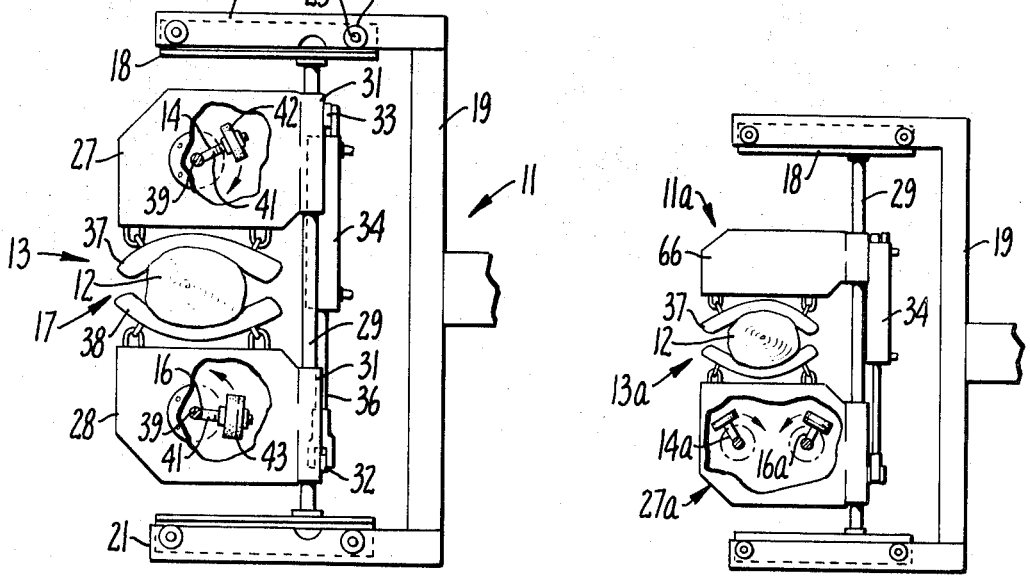
FIG. 2 is an enlarged plan view of the tree shaking apparatus shown in FIG. 1, with certain of the supporting structure being removed for clarity of illustration.
FIG. 4 is an enlarged plan view of a second form of the tree shaking apparatus of the present invention.

During shaking, the vibrating unit 13 is freely mounted on the tree 12 in such a way that it is not unduly impeded in its vibratory motion by any external structure. For this purpose, the vibrating unit 13 here includes a support member 18 in the form of a frame which is held in swinging fashion by a main support 19. As best seen in FIGS. 1 and 2, the main support 19 is fork shaped and has a pair of parallel members 21 and 22 adapted to fit horizontally on each side of the tree to be shaken. The support member 18 is swingably supported from members 21 and 22 by four connecting rods 23 held in shock absorbers 24.

The main support 19 may be attached to any suitable vehicle, and a preferred attachment is that shown in FIG. 1 where the support is attached to a tractor 25 through suitable linkages 26 adapted to provide elevation to main support 19 and yet retain it in the substantially horizontal position. These linkages are constructed to be raised and lowered by standard lifts utilized for handling other tools which are constructed for use with a tractor.

The vibrating unit 13 includes two vibrating elements 27 and 28, which are slidably mounted on rods 29 by two pairs of sleeves 30 and 31. Each pair of sleeves 30 and 31 are held as a single unit by cross bars 32 and 33 and the vibrating elements are urged relatively toward one another by forces applied to these cross bars. These forces are obtained by operation of a hydraulic cylinder 34 and its associated connecting rod 36.

In this way, the hydraulic cylinder and associated equipment serves as the mobile part of the clamping means 17, the clamping jaws being in the form of flexible pads 37 and 38 positioned in face to face relationship on each of the vibrating elements 27. Preferably, these flexible pads are composed of a rubber-like substance and are contoured to spread their forces more evenly over the irregular shape of a trunk of a tree.

As described so far, the structure of the embodiment of FIGS. 1 and 2 is similar to the corresponding structure shown in my U.S. Pat. No. 3,338,040, with the exception of vibrating elements 27 and 28. Accordingly, a more detailed description of certain of the common elements may be found in said patent which is incorporated herein by reference for that purpose.

The unique varying pattern and intensity of vibrating forces provided by the present invention result from from driving the eccentrically weighted rotors 14 and 16 and in a novel manner and forming them so they have different moments of inertia. As shown in FIGS. 1 and 2, each of the rotors 14 and 16 has a vertical shaft 39, journalled in elements 27 and 28 respectively, and a horizontal shaft 41 extending perpendicularly from the vertical shaft so as to rotate in a horizontal plane. Each of the shafts 41 is threaded to carry a weight spaced from the axes of shafts 39 and secured between a pair of lock nuts. The different moments of inertia are provided in this form of the invention by making the weights of different mass. Thus, as here shown the weight 42 of rotor 14 is smaller than the weight 43 of rotor 16. By smaller, it is meant that weight 42 is lighter, the size reference being based on weight or mass. Each of the weights 42 and 43 are positioned so as to provide substantially the same length of radial arm through the shaft 41. Accordingly, the different weights provide different moments of inertia for the rotors and a corresponding difference in "wobble" effect.

By using easily detachable weights, it is possible to utilized different weight pairs for different sizes or varieties of trees. For example, in a typical tree the weight 42 will weight 21 pounds and the weight 43 will weigh 27 pounds. However, where it is desired to shake a heavier tree weights of 27 and 33 pounds may be used respectively. An increased harmonic shock is obtained when the differential is increased; for example, weights of 24 and 33 pounds respectively will cause a greater effect than weights of 27 and 33 pounds. On the other hand, a weight pair of 14 and 18 pounds could be used for situations where reduced harmonic shock is desired. All of these different weight pairs have been tried and found to be satisfactory in operation.

In order to prevent dirt and debris from interfering with the operation of the rotors and for the sake of safety, is is preferred to provide a housing for each rotor with the housing having an access door or removable panel so that the weights may be changed or adjusted as desired.

In order to produce the novel action of the invention, it is important that the two motors draw from the same power source so that the total power used is the sum of that used by the two motors, but with a parallel or differential draw so that one motor can drawn more than the other. In general, this power supply could be hydraulic, pneumatic, electrical or even mechanical. For example, if the system were electrical, a common generator could be driven to provide two separate motors wired in parallel from the generator, if pneumatic, the the motors would receive compressed air from a single source, and, if mechanical, the shafts would be driven from a single source of mechanical power through a suitable differential gear or the like. However, it is preferred to utilize hydraulic motors in a hydraulic system because of simplicity, and the hydraulic motors are capable of delivering a large amount of power from relatively small motors. In addition, these motors are found to be durable and capable of withstanding without injury the vibrations present in the vibrating unit on which they are carried.

Figure 3:
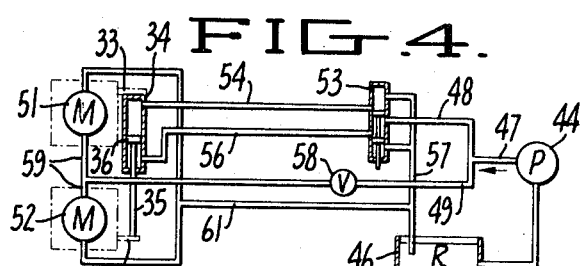
FIG. 3 is a diagrammatic view illustrating a typical hydraulic power supply system used in a preferred form of the invention.

A typical hydraulic system that may be used in this invention is shown in FIG. 3 and it will be illustrative of the mode of operation of suitable power systems in general. As shown therein, the hydraulic system includes a pump 44 which takes hydraulic fluid from a reservoir 46 and supplies it under pressure in line 47. The pump 44 is attached to the power takeoff (not shown) of the tractor 25 and thereby converts tractor engine power to hydraulic power for use in the tree shaking apparatus. In this connection, it will be noted that the stored momentum of the tractor engine flywheel tends to keep the pump going and that surge demands of power may be met in this way.

Line 47 is divided into a supply line 48, leading to the clamping cylinder 34, and a supply line 49 for motors 51 and 52, which drive the shafts 39 of rotors 14 and 16 respectively. Fluid from supply line 48 goes through a two-way valve 53 to the appropriate side of cylinder 34 through one of lines 54 or 56, depending upon the valve position, and returns through the other line to fluid return line 57. Hydraulic fluid in line 49 similarly passes through a shut-off valve 58 and through branching supply lines 59 to the inlets both of motors 51 and 52, then back through return line 61 to the reservoir 46.

In order to operate the hydraulic valves 53 and 58, levers 62 and 63 are provided in a convenient position so that the operator may perform the desired shaking from his seat on the tractor.

In the operation of the device shown in FIGS. 1 and 2, the tratcor 25 is driven into a position such that the vibrating unit 13 is centrally placed with its vibrating elements 27 and 28 on each side of a tree 12 to be shaken. The lever 62 is then operated to move the hydraulic control valve 53 to the position shown in FIG. 4, retracting the piston in cylinder 34 to bring the vibrating elements 27 and 28 relatively towards one another and effect clamping of the flexible pads 37 and 38 against the tree. With the tractor motor revved up to full power and with the vibrating units in place, lever 63 is operated to open valve 58 and supply hydraulic fluid to drive the motors 51, 52.

After shaking is completed, lever 63 is operated to shut off the motors 51, 52, and lever 62 is operated to move valve 53 to its other position so that supply line 48 is in communication with line 54 and line 56 is connected to exhaust line 57. This causes the cylinder 34 to spread the vibrating units apart and unclamp the unit from the tree.

During the shaking operation, the hydraulic motors operate independently of one another so that the weighted eccentrics may change their relative oribtal positions as a result of different speeds of rotation. This change of relative position occurs as the weights seek the lowest level of transference of vibrational energy in accordance with the usual mechanical principles. However, due to the mismatch of the eccentrics in the present invention, the rotors are forced into a harmonic cycle which causes periods of concentrated shaking as described above. After the concentrated shaking period, the large rotor will slow down and the tractor motor may have itself perceptibly decelerated. Then the large rotor picks up speed until the next concentrated shaking action occurs. When the rotors are on equal radial arms and the weights are, say 21 and 27 pounds, the harmonic period is about one second. The time of concentrating shaking action is on the order of one-fifth of a second. It will also be noted that this concentrated shaking occurs along a line perpendicular to the tree with the line varying in direction so that subsequent shaking operations utilize a different angle of attack. This change in angle of attack results in complete shaking with only a few harmonic periods having been gone through.

For example, a fully loaded prune tree was shaken by the operation described above. On the first intense harmonic shock, the limbs rose about two feet and a major portion of the fruit was shaken off. On the second shock, nearly all of the remaining fruit was shaken off, and on the third shock the entire tree was stripped together with a few peripheral leaves. Accordingly, the apparatus completely removed the fruit of a fully laden prune tree in about three seconds.

While it is preferred to space the mismatched rotors on opposite sides of the tree as illustrated in the embodiment shown in FIGS. 1 and 2, it will be appreciated that the mismatched rotors could be spaced in other ways because the entire unit acts together with the tree as a single vibrating entity. Accordingly, a modified form of the invention is shown in FIG. 4, in which both rotors are located on the same side of the tree.

Referring more particularly to FIG. 4, there is shown a tree shaking apparatus 11a comprising a vibrating unit 13a mounted on a support member 18 which is suspended from a main support 19 in the same fashion as the similar parts described for the embodiment of FIGS. 1 and 2. However, the vibrating unit 13a differs from the vibrating unit 13 in that it comprises a vibrating element 27a adapted to fit on one side of the tree in oppsed relation to a pad holder or clamp jaw 66 disposed on the other side of the tree. The vibrating unit 27a and pad holder 66 are mounted in sliding fashion on a rod 29, and held in spaced relation and clamp through cylinder 34 in the same manner as in the embodiment of FIGS. 1 and 2. Pad holder 66 may be any sort of backing member suitable for holding a pad 37, and is not constructed to carry any rotors or such elements in the form here shown. The vibrating element 27a, however, is constructed to carry two rotors 14a and 16a with the rotors being rigidly mounted thereon and weighted differently in the manner similar to that described for the equivalent rotors in FIG. 2. It will be noted that the rotors 14a and 16a are disposed on the same side of the tree rather than on opposite sides. This weight distribution is quite satisfactory because the rotors act on the entire support member 18 and tree as a single entity.

Although the alternate positioning of the eccentric rotors illustrated in FIG. 4 has the mismatched eccentrics in side-by-side fashion on one side of the tree, it will be appreciated that other positioning will also operate effectively. For example, the eccentrics can be oriented so as to rotate about the same axis with one eccentric above the other, or they can be located so as to form a straight line with the tree with one behind the other. In fact, any arrangement, containing the two mismatched eccentrics on the support member clamped rigidly to the tree, is believed to be operative.

Figure 5:
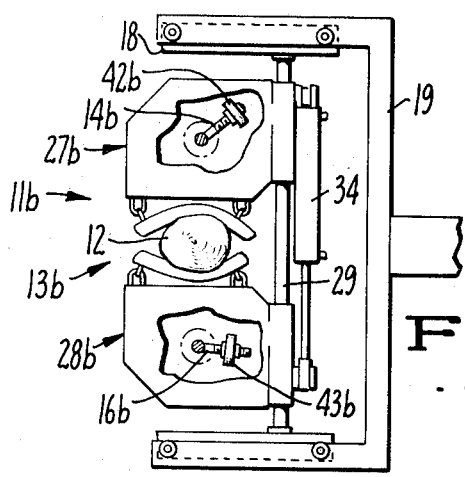
FIG. 5 is an enlarged plan view of a third modified form of tree shaking apparatus of the present invention.

In FIG. 5, there is shown another embodiment of the invention illustrating a tree shaking aparatus 11b, which is similar to the embodiment of FIGS. 1 and 2 except that the different moments of inertia of the eccentric rotors is provided by utilizing weights on different length radial arms instead of different size weights. Accordingly the tree shaking aparatus 11b comprises a vibrating unit 13b having vibrating elements 27b slidably mounted on a rod 29 between a closed clamping position and an open position through the action of cylinder 34. Vibrating elements 27b and 28b are similar to vibrating elements 27 and 28 except that vibrating element 27b has a rotor 14b with its weight 42b being disposed on a substantially longer radial arm and the radial arm defined by weight 43b on rotor 16b. The vibrating unit 13b is supported by support member 18 which is hung from main support 19 in the same manner as in the embodiment of FIGS. 1 and 2.

It should be apparent that differences in the mass of the weights, or the distance of the center of gravity of the rotors from the center of rotation, or both, can be employed to provide the described different moments of inertia. In addition, it will be appreciated that the geometry of the rotors with respect to positioning of the rotors relative to the tree and to each other can be varied, as suggested in the various forms shown herein. Thus, in the embodiment of FIGS. 6 through 8, the invention is applied to a tree shaking apparatus basically constructed according to U.S. Pat. No. 3,163,458, but with different harmonics than are taught in the patent being provided, by mismatching the moments of inertia of the rotors in accordance with the teachings herein.

Figure 6:
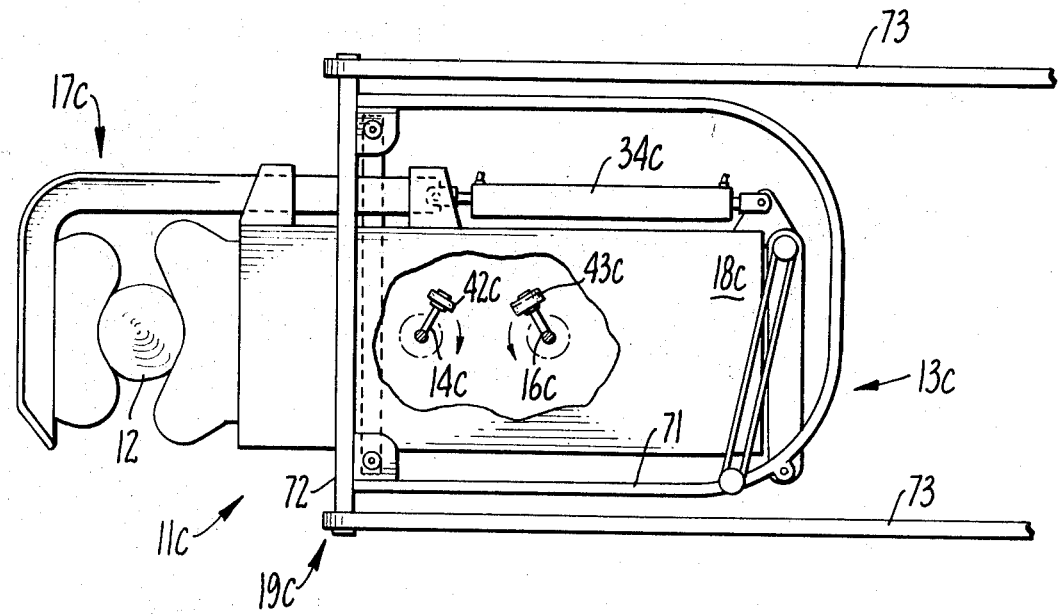
FIG. 6 is a plan view of a fourth form of tree shaking apparatus constructed according to the present invention, and in which different supporting structure and different layout for the rotors is illustrated.
Figure 7:
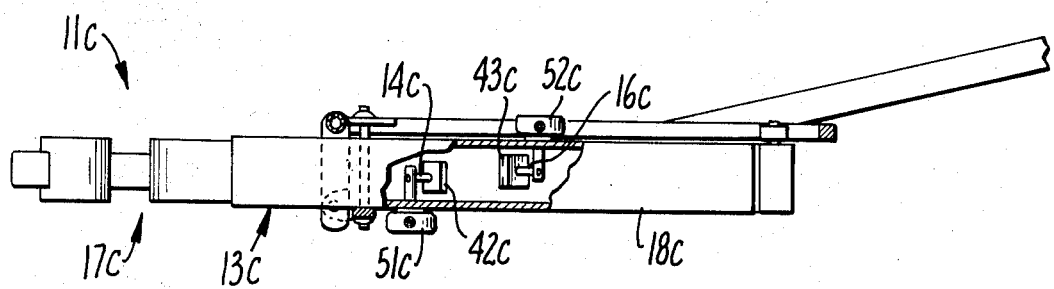
FIG. 7 is a side elevational view of the tree shaking apparatus shown in FIG. 6, certain of the parts being broken away to illustrate internal structure.

Referring more particularly to the embodiment of FIGS. 6 and 7, the tree shaking apparatus 11c comprises a vibrating unit 13c having clamping means 17c and a support member 18c in the form of a housing on which rotors 14c and 16c are mounted. The support member 18c is carried in free floating relation on main support 19c which comprises a generally U-shaped frame 71 having its end member 72 pivotally mounted on arms 73 which in turn are mounted on a tractor or other vehicle. The construction of the support member 18c, and its attachment to main support 19c together with a specific construction of clamping means 17c is similar to that shown and described in U.S. Pat. No. 3,163,458. Accordingly, a detailed description of this mechanism will not be given here but instead the patent is referred to for that purpose. However, it should be noted the clamping means 17c is opened and closed by the action of hydraulic cylinder 34c, which operates in the same manner to open and close the jaw of the clamping means as the cylinder 34 in the embodiment of FIG. 4.

In the embodiment shown in FIGS. 6 and 7, each rotor 14c and 16c is powered by a separate hydraulic motor 51c and 52c. These motors and the hydraulic cylinders 34c are coupled into a hydraulic supply system generally similar to that shown in FIG. 3. The rotors 14c and 16c here have different moments of inertia because rotor 14c is equipped with a weight 42c which is lighter than the weight 43c on rotor 16c. As here shown, these differing weights are on substantially equal radial arms so that a mismatched moment of inertia is achieved. Of course, the other modes of obtaining differing moments of inertia suggested herein can be employed.

Figure 8:
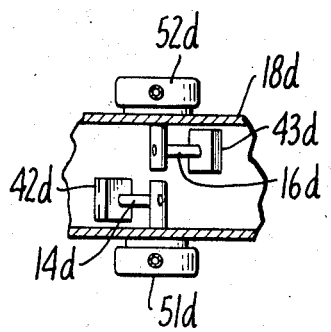
FIG. 8 is a vertical cross sectional view of a modified form of tree shaker suitable for use with the supporting structure of the embodiment shown in FIGS. 6 and 7.

FIG. 8 illustrates another form of the invention similar to that shown in FIGS. 6 and 7, but in which the rotors are coaxially aligned. As there shown, the housing or support member 18d is similar to the support member 18c of the embodiment of FIGS. 6 and 7 and is carried in the same way. However, rotors 14d and 16d are rotatably mounted in coaxial alignment on support member 18d and are driven by motors 51d and 52d respectively. The rotors 14d and 16d here have mismatched weights 42d and 43d, respectively, in order to achieve the desired hydro harmonic effect which results in the described concentrated shaking action. Motors 51d and 52d are preferably hydraulic motors connected in a parallel system in accordance with the hydraulic layout shown in FIG. 3. Accordingly, these motors are free to cycle at varying rotative speed, and will therefore fall into the concentrated shaking action found to be achieved by rotors with mismatched inertia moments.

From the foregoing it may be seen that a novel harmonic system incorporating mismatched rotors has been provided which is especially suitable for producing a desired concentrated harmonic vibratory action capable of shaking trees in a plurality of substantially horizontal vibrational directions. It is also seen that this novel shaking action is achieved by the use of a variety of relatively simple, novel combinations of rotors, motors and power supply making it possible to apply the principles of the present invention to existing support structures.

I claim:
1. In a vibratory tree shaker system wherein a plurality of power driven eccentric rotors are clamped to the trunk of the tree to be shaken, the improvement comprising:
  eccentric rotors having different moments of inertia, the moment of inertia of one of said rotors is greater than the moment of inertia of the other by a ratio of up to 2,
  a plurality of power driven units one each connected to one each of said rotors and each having independently of the other individual load responsive self regulating speeds of rotation, and
  drive means connected to said driven units providing individual self regulating speed operation of said driven units,
  the difference in said moments and said individual load responsive self regulating speeds of said rotors providing relatively high frequency low amplitude vibration and regular periodic bursts of relatively low frequency high amplitude vibration.

2. The improvement of claim 1 wherein said ratio is between about 1.2 and 2.

3. The improvement of claim 2 wherein said driven units each comprise an hydraulic motor and said drive means comprises a power driven hydraulic pump having its output connected in parallel to said motors.

4. The improvement of claim 3 wherein a pair of said rotors are mounted for rotation about horizontally spaced vertical axes disposed on opposite sides of said trunk.

References Cited

UNITED STATES PATENTS

| | | | |
|---|---|---|---|
| 3,163,458 | 12/1964 | Brandt, Jr. | 56—328 |
| 3,220,268 | 11/1965 | Brandt, Jr. | 74—87 |
| 3,338,040 | 8/1967 | Shipley, Jr. | 56—328 |

LOUIS G. MANCENE, Primary Examiner

J. N. ESKOVITZ, Assistant Examiner

U.S. Cl. X.R.

74—87